(12) United States Patent
Niitsuma et al.

(10) Patent No.: US 11,716,981 B2
(45) Date of Patent: Aug. 8, 2023

(54) SPINNING REEL (71) Applicant: Shimano Inc., Osaka (JP)

(72) Inventors: Akira Niitsuma, Osaka (JP); Atsushi Kawamata, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/869,416

(22) Filed: Jul. 20, 2022

(65) Prior Publication Data

US 2023/0087009 A1 Mar. 23, 2023

(30) Foreign Application Priority Data

Sep. 22, 2021 (JP) ................. 2021-154456

(51) Int. Cl.
*A01K 89/01* (2006.01)
*A01K 89/015* (2006.01)
(52) U.S. Cl.
CPC .... *A01K 89/0186* (2015.05); *A01K 89/01143* (2015.05)
(58) Field of Classification Search
CPC ........ A01K 89/01141; A01K 89/01143; A01K 89/0187; A01K 89/01903
See application file for complete search history.

(56) References Cited

U.S. PATENT DOCUMENTS

| 4,918,361 | A | * | 4/1990 | Weinert | ................. | G05D 17/02 318/480 |
| 2016/0088825 | A1 | * | 3/2016 | Ikebukuro | .......... | A01K 89/0189 242/260 |
| 2016/0219853 | A1 | * | 8/2016 | Takechi | ........... | A01K 89/01916 |
| 2019/0327948 | A1 | * | 10/2019 | Chan | ................. | A01K 89/0186 |

FOREIGN PATENT DOCUMENTS

| EP | 3066920 A1 * | 9/2016 | ............. A01K 89/01 |
| JP | 2016-136917 A | 8/2016 | |

* cited by examiner

*Primary Examiner* — Emmanuel M Marcelo
(74) *Attorney, Agent, or Firm* — Global IP Counselors, LLP (57) ABSTRACT

A spinning reel, includes a reel body, a spool shaft supported by the reel body, a reciprocating mechanism having a slider mounted on the spool shaft and a worm shaft configured to rotate to move the spool shaft and the slider back and forth, and a torque-limiting mechanism that includes the worm shaft, a worm shaft gear that is supported so as to be rotatable with respect to the worm shaft, and a frictional force-generating member disposed between the worm shaft and the worm shaft gear and that is configured to contact the worm shaft or the worm shaft gear to generate a frictional force in a circumferential direction and to permit or cancel transmission of torque from the worm shaft gear to the worm shaft by the frictional force.

8 Claims, 11 Drawing Sheets

SPINNING REEL

CROSS-REFERENCE TO RELATED APPLICATIONS

This application claims priority to Japanese Patent Application No. 2021-154456, filed on Sep. 22, 2021. The entire disclosures of Japanese Patent Application No. 2021-154456 are hereby incorporated by reference.

BACKGROUND

Field of the Invention

The present disclosure relates to a spinning reel.

Background Art

Conventional spinning reels can comprise a reel body, a spool shaft, a reciprocating mechanism, and a torque-limiting mechanism (refer to Japanese Published Unexamined Application No. 2016-136917).

The reciprocating mechanism has a slider mounted on the spool shaft, and a worm shaft that rotates to move the spool shaft and the slider back and forth.

The torque-limiting mechanism has a worm shaft gear that is rotatable with respect to the worm shaft, a plurality of hooking recesses, a pin member, and a biasing member. The plurality of hooking recesses are formed on the inner circumferential surface of the worm shaft gear.

The pin member and the biasing member are disposed on the worm shaft. The pin member is disposed facing the inner circumferential surface of the worm shaft gear. The biasing member biases the pin member toward the inner circumferential surface of the worm shaft gear.

In the state in which the head part of the pin member is engaged with any one of the plurality of hooking recesses, the torque of the worm shaft gear is transmitted to the worm shaft. On the other hand, when the torque of the worm shaft gear exceeds the permitted torque, the pin member repeatedly engages with and disengages from the plurality of hooking recesses, so that the worm shaft gear rotates intermittently with respect to the worm shaft. In this state, the torque of the worm shaft gear is not transmitted to the worm shaft.

SUMMARY

In the conventional torque-limiting mechanism, the pin member is engaged with the hooking recess in order to increase the permitted torque. In this manner, in the case that the torque of the worm shaft gear exceeds the permitted torque in a state in which a large amount of torque acts on the worm shaft gear, the worm shaft gear rotates intermittently relative to the worm shaft gear.

In this case, since the worm shaft gear must withstand the impact at the time of this intermittent operation, it is necessary to ensure the strength of the worm shaft gear. That is, it has been determined that the conventional torque-limiting mechanism has the problem that the worm shaft gear has an increased size.

Embodiments of the present invention were realized in light of the above-described problems, and an object of the present disclosure is to provide a spinning reel in which the size of the worm shaft gear that constitutes the torque-limiting mechanism is reduced.

The spinning reel according to one aspect of the present invention comprises a reel body, a spool shaft, a reciprocating mechanism, and a torque-limiting mechanism. The spool shaft is supported by the reel body. The reciprocating mechanism includes a slider mounted on the spool shaft, a worm shaft that rotates to move the spool shaft and the slider back and forward reciprocally, and a worm shaft gear supported so as to be rotatable with respect to the worm shaft.

The torque-limiting mechanism incudes a frictional force-generating member. The frictional force-generating member is disposed between the worm shaft and the worm shaft gear. The frictional force-generating member comes in contact with the worm shaft and/or the worm shaft gear, thereby generating frictional force in the circumferential direction. The frictional force-generating member permits or cancels torque transmission from the worm shaft gear to the worm shaft by the force of friction.

In the present spinning reel, when the torque of the worm shaft gear is less than or equal to the permitted torque, frictional force is generated in the circumferential direction between the frictional force-generating member and the worm shaft and/or the worm shaft gear. In this state, if the torque of the worm shaft gear exceeds the permitted torque, the worm shaft gear continuously rotates with respect to the worm shaft.

Thus, by the spinning reel of the present disclosure, the size of the worm shaft gear that constitutes the torque-limiting mechanism can be reduced in size, compared with a worm shaft gear that rotates intermittently with respect to the worm shaft, as in the prior art.

In a spinning reel according to another aspect of the present invention, the frictional force-generating member is preferably hooked to the worm shaft gear. In this case, the frictional force-generating member is a torsion spring disposed on the outer circumferential surface of the worm shaft so as to be slidable. By this configuration, it is possible to stably generate a frictional force between the frictional force-generating member and the worm shaft.

In the spinning reel according to another aspect of the present invention, the torsion spring preferably has a first spring portion that is wound in a first winding direction. In this case, the first spring portion is disposed on the outer circumferential surface of the worm shaft such that the first winding direction is opposite to a line-winding direction of the worm shaft gear.

By this configuration, when the worm shaft gear rotates in the line-winding (reeling) direction, since the first spring portion of the torsion spring tightens, it is advantageously possible to transmit the torque from the worm shaft gear to the worm shaft.

In the spinning reel according to another aspect of the present invention, the torsion spring preferably also has a second spring portion that is wound in a second winding direction which is opposite to the first winding direction. Here, the second spring portion is connected to the first spring portion. The second spring portion is disposed on the outer circumferential surface of the worm shaft such that the second winding direction is the same as the line-winding direction of the worm shaft gear.

Here, if an external force acts on the spool shaft in a direction opposite to the direction in which the spool shaft advances, the worm shaft gear rotates in the direction opposite to the line-winding direction. In this case, there is the risk that the first spring portion will loosen. However, by connecting the second spring portion described above to the first spring portion, even if the worm shaft gear rotates in the direction opposite to the line-winding direction, the second spring portion can prevent the loosening of the first spring portion.

In the spinning reel according to another aspect of the present invention, the worm shaft gear preferably has a hole portion that extends in an axial direction. Here, the torsion spring has a hooking portion that is hooked to the hole portion. By this configuration, the torsion spring can advantageously be hooked to the worm shaft gear.

In the spinning reel according to another aspect of the present invention, the hooking portion preferably includes an insertion portion that is inserted into the hole portion and a pawl portion that extends from the insertion portion along the side surface of the worm shaft gear. By this configuration, the torsion spring can advantageously be hooked to the worm shaft gear.

In the spinning reel according to another aspect of the present invention, the worm shaft gear preferably has a projection that protrudes in the axial direction. In this case, the torsion spring has a hooking portion that is hooked to the projection. By this configuration, the torsion spring can advantageously be hooked to the worm shaft gear.

In the spinning reel according to another aspect of the present invention, the worm shaft gear preferably has an insertion hole into which the worm shaft is inserted. In this case, the torque-limiting mechanism also has an O-ring arranged between the outer circumferential surface of the worm shaft and the inner circumferential surface of the insertion hole.

In this configuration, the O-ring is disposed between the outer circumferential surface of the worm shaft and the inner circumferential surface of the insertion hole, and thus, the O-ring can prevent or facilitate suppression of the loosening of the first spring portion.

In the present invention, it is possible to reduce the size of the worm shaft gear of the spinning reel.

DETAILED DESCRIPTION OF EMBODIMENTS

Figure 1:
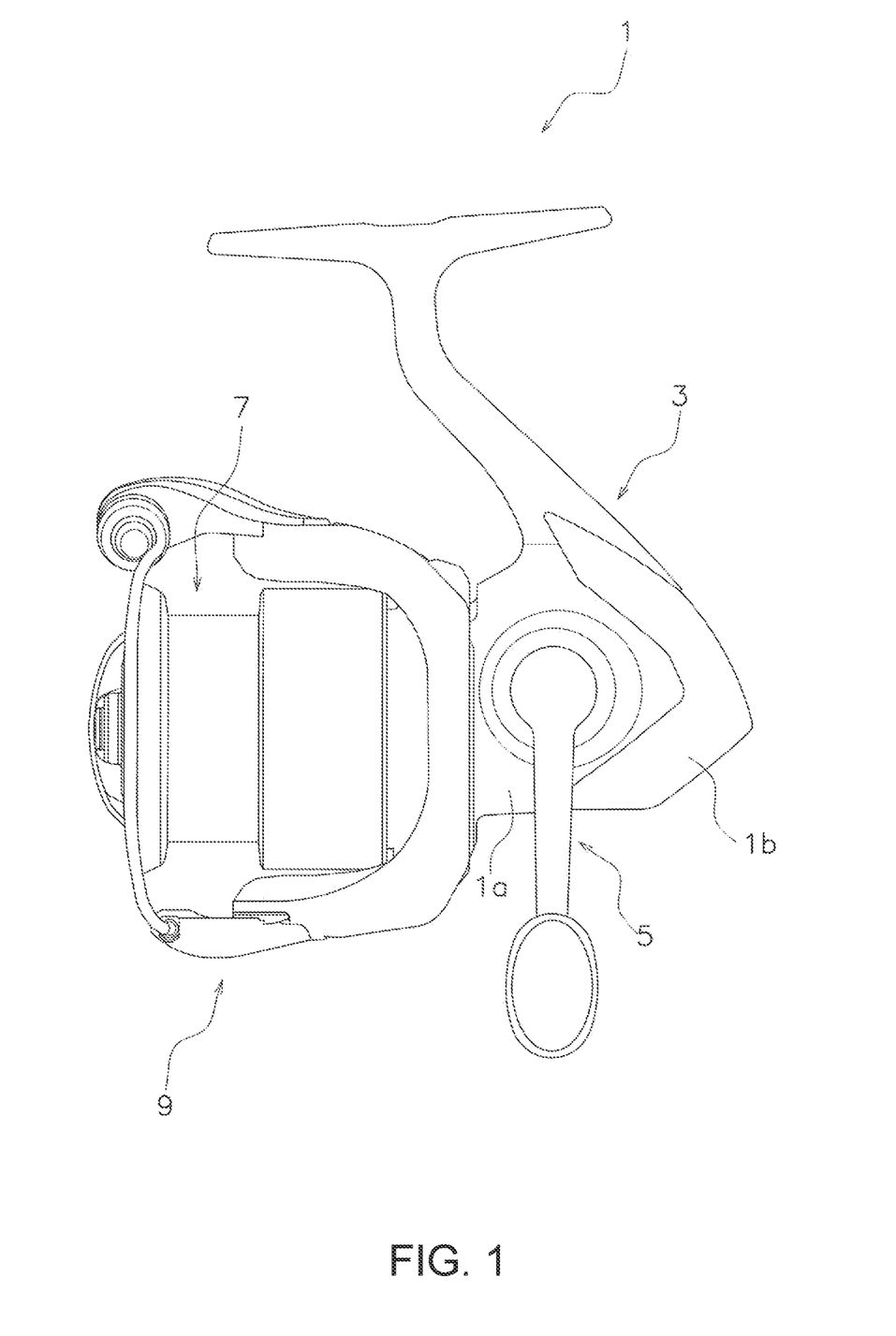
FIG. 1 is a side view of the spinning reel according to an embodiment of the present invention.
Figure 2:
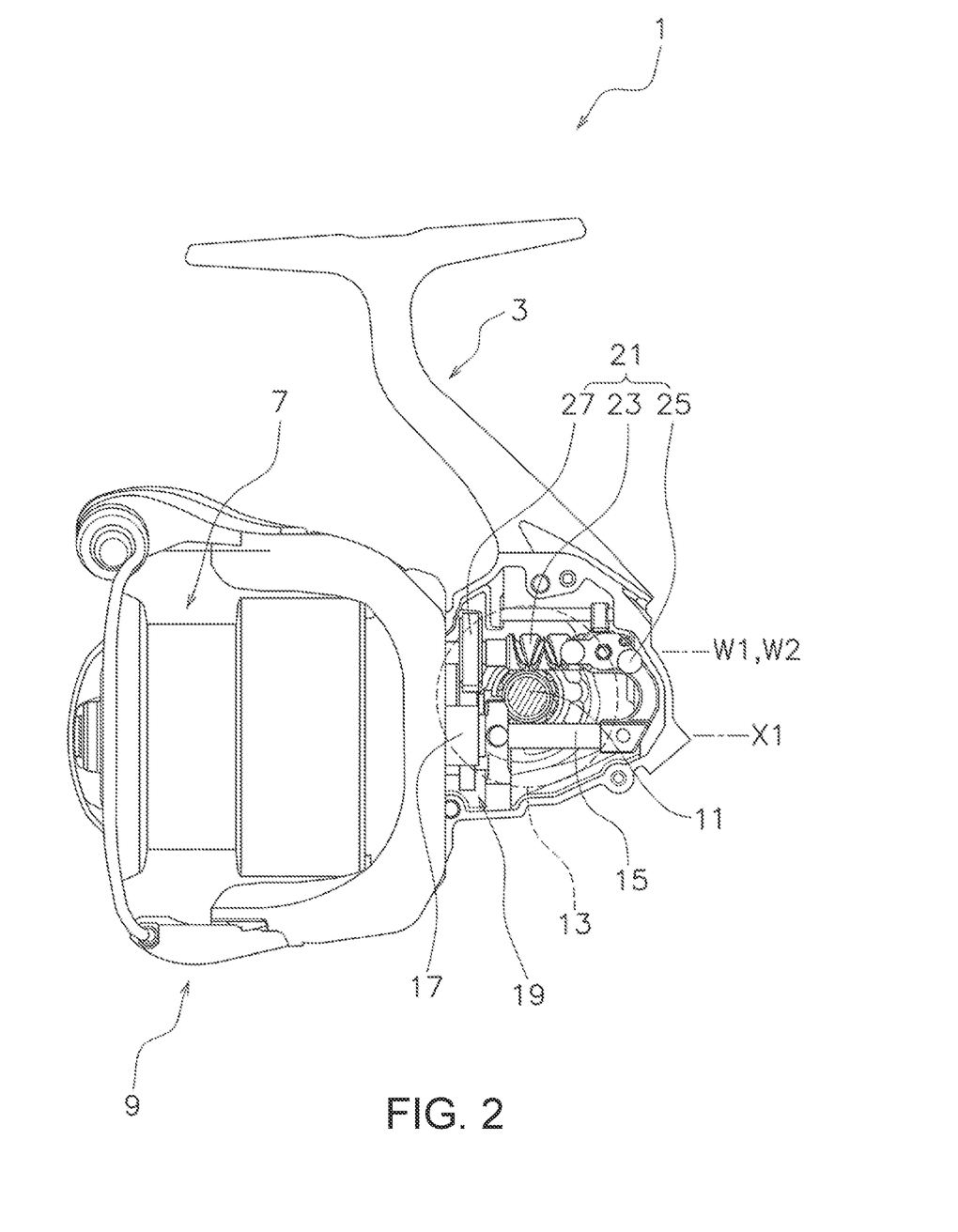
FIG. 2 is a side view in which the side cover and the main body guard have been removed from the spinning reel.

As shown in FIG. 1, a spinning reel 1 to which one embodiment of the present invention is applied comprises a reel body 3, a handle 5, a spool 7, and a rotor 9. As shown in FIG. 2, the spinning reel 1 further comprises a handle shaft 11, a drive gear 13, a spool shaft 15, a pinion gear 17, a speed-reducing mechanism 19, an oscillating mechanism 21, and a torque-limiting mechanism 34 (refer to FIG. 6). FIG. 2 is a diagram in which a side cover 1a and a main body guard 1b of the spinning reel 1 shown in FIG. 1 have been removed.

As shown in FIG. 1, the handle 5 is supported by the reel body 3 so as to be rotatable. In the present embodiment, an example of the handle 5 being disposed on the left side of the reel body 3 is shown. However, the handle 5 can be disposed on the right side of the reel body 3. The handle 5 is mounted on the handle shaft 11.

As shown in FIG. 2, the handle shaft 11 is supported by the reel body 3 so as to be rotatable. The drive gear 13 is mounted on the handle shaft 11 so as to rotate integrally with the handle shaft 11. The drive gear 13 meshes with the pinion gear 17.

A fishing line is wound around the spool 7. As shown in FIG. 2, the spool 7 is configured to as to be movable in the front-rear direction with respect to the reel body 3, together with the spool shaft 15. The spool 7 is connected to the spool shaft 15. For example, the spool 7 is connected to the distal end portion of the spool shaft 15 via a drag mechanism, which is not shown. In a state in which the spool 7 is connected to the spool shaft 15, the central axis of the spool 7 is coaxial with spool axis X1, described further below.

As shown in FIG. 2, the spool shaft 15 is supported so as to be movable in the front-rear direction with respect to the reel body 3. The spool shaft 15 is inserted through the inner circumferential portion of the pinion gear 17. The spool shaft 15 is moved back and forth in reciprocating fashion with respect to the reel body 3 by operation of the oscillating mechanism 21.

The spool shaft 15 has a spool axis X1. The spool axis X1 extends in the front-rear direction. Unless otherwise specified, the axial direction is the direction of extension of spool axis X1. The radial direction is away from spool axis X1. The circumferential direction is the direction around spool axis X1.

The oscillating mechanism 21 moves the spool shaft 15 in the front-rear direction in conjunction with the rotation of the handle shaft 11. The oscillating mechanism 21 is disposed in an internal space of the reel body 3.

Figure 3:
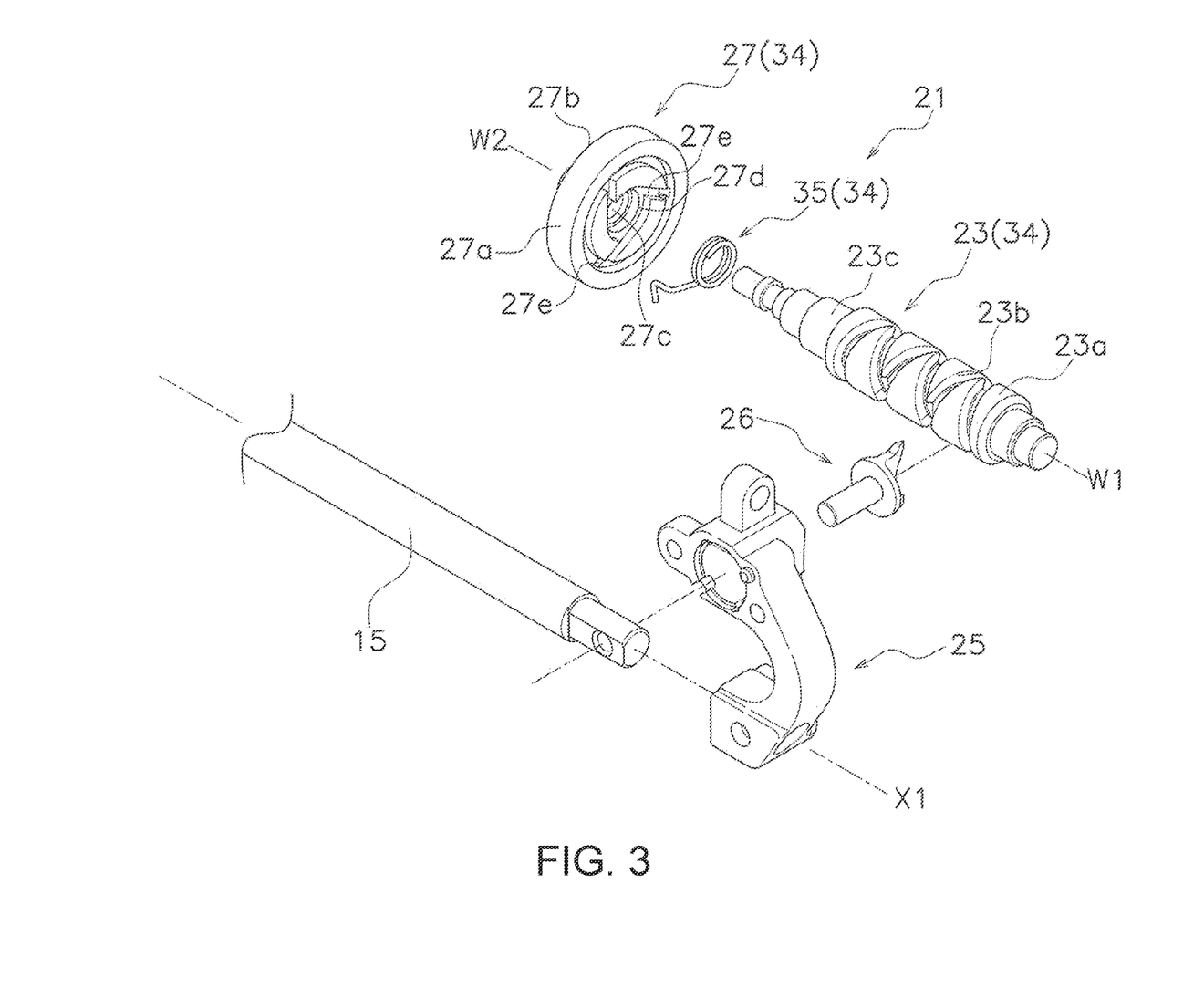
FIG. 3 is an exploded perspective view for explaining the oscillating mechanism.

As shown in FIGS. 2 and 3, the oscillating mechanism 21 includes a worm shaft 23, a slider 25, and a worm shaft gear 27.

The worm shaft 23 rotates in order to move the spool shaft 15 and the slider 25 in the front-rear direction. The worm shaft 23 is disposed parallel to the spool shaft 15. The worm shaft 23 is supported by the reel body 3 so as to be rotatable. The worm shaft 23 has axis of rotation W1.

The worm shaft 23 has a shaft body 23a, a groove portion 23b, and a spring accommodation portion 23c. The shaft body 23a is a shaft member that is long in one direction. The shaft body 23a extends in the axial direction in which axis of rotation W1 extends. The groove portion 23b is disposed on the outer circumferential surface of the shaft body 23a. A pawl member 26, described further below, engages the groove portion 23b.

A torsion spring 35 (described further below) of the torque-limiting mechanism 34 is disposed in the spring accommodation portion 23c. The spring accommodation portion 23c has a cylindrical shape. The spring accommodation portion 23c is disposed on the shaft body 23a so as to be adjacent to the groove portion 23b in the axial direction in which axis of rotation W1 extends.

The slider 25 is mounted on the spool shaft 15. For example, the slider 25 is fixed to the rear end of the spool shaft 15. The slider 25 moves in the front-rear direction by the rotation of the worm shaft 23.

For example, as shown in FIG. 3, the pawl member 26 is mounted on the slider 25. The pawl member 26 is mounted on the spool shaft 15 and the slider 25 so as to be rotatable. The pawl member 26 engages the groove portion 23b of the worm shaft 23.

As a result, when the worm shaft 23 rotates, the pawl member 26 moves along the groove portion 23b of the worm shaft 23. The slider 25 thus moves in the front-rear direction.

As shown in FIGS. 2 and 3, the worm shaft gear 27 is disposed on the worm shaft 23. The worm shaft gear 27 is supported so as to rotate with respect to the worm shaft 23. The direction in which the worm shaft gear 27 rotates when the fishing line is wound is referred to below as line-winding (or reeling) direction R1.

The worm shaft gear 27 has axis of rotation W2. For example, the worm shaft gear 27 is disposed on the worm shaft 23 such that axis of rotation W2 of the worm shaft gear 27 is concentric with axis of rotation W1 of the worm shaft 23.

Figure 4A:
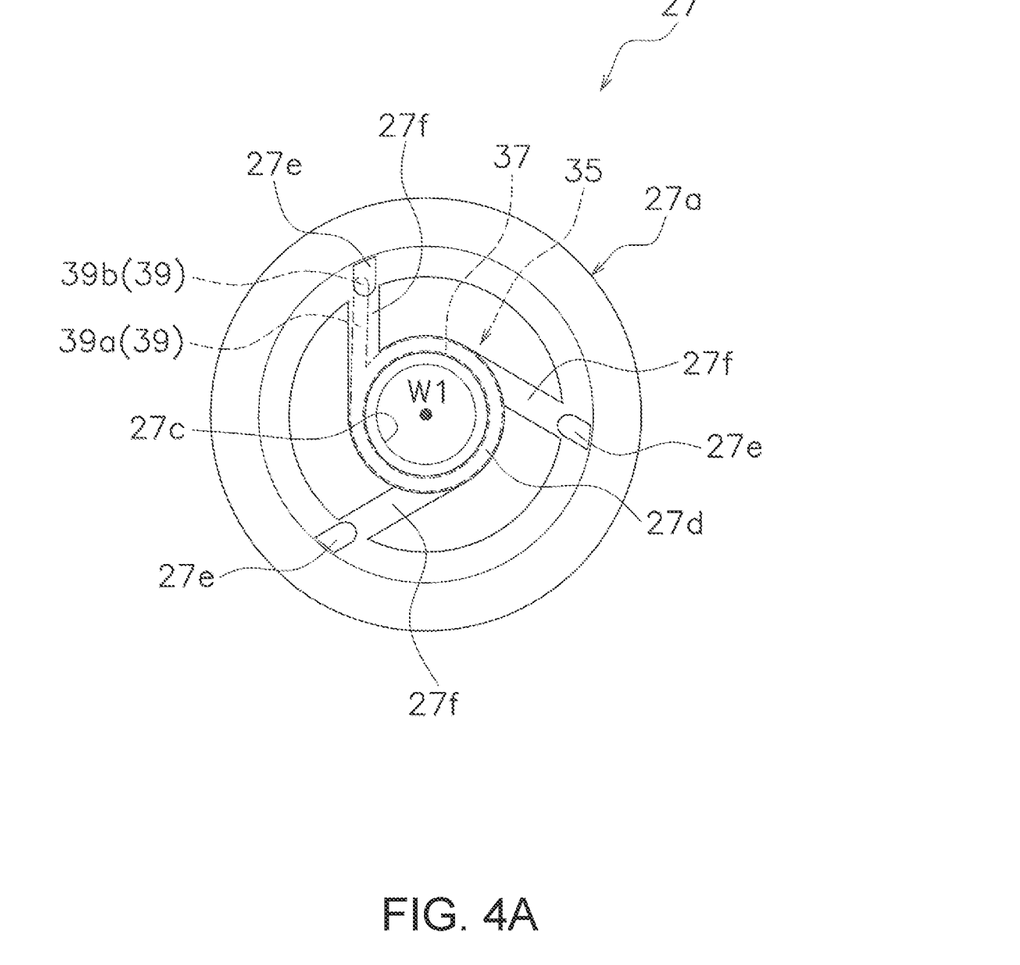
FIG. 4A is a side view (rear surface) of the worm shaft gear.
Figure 4B:
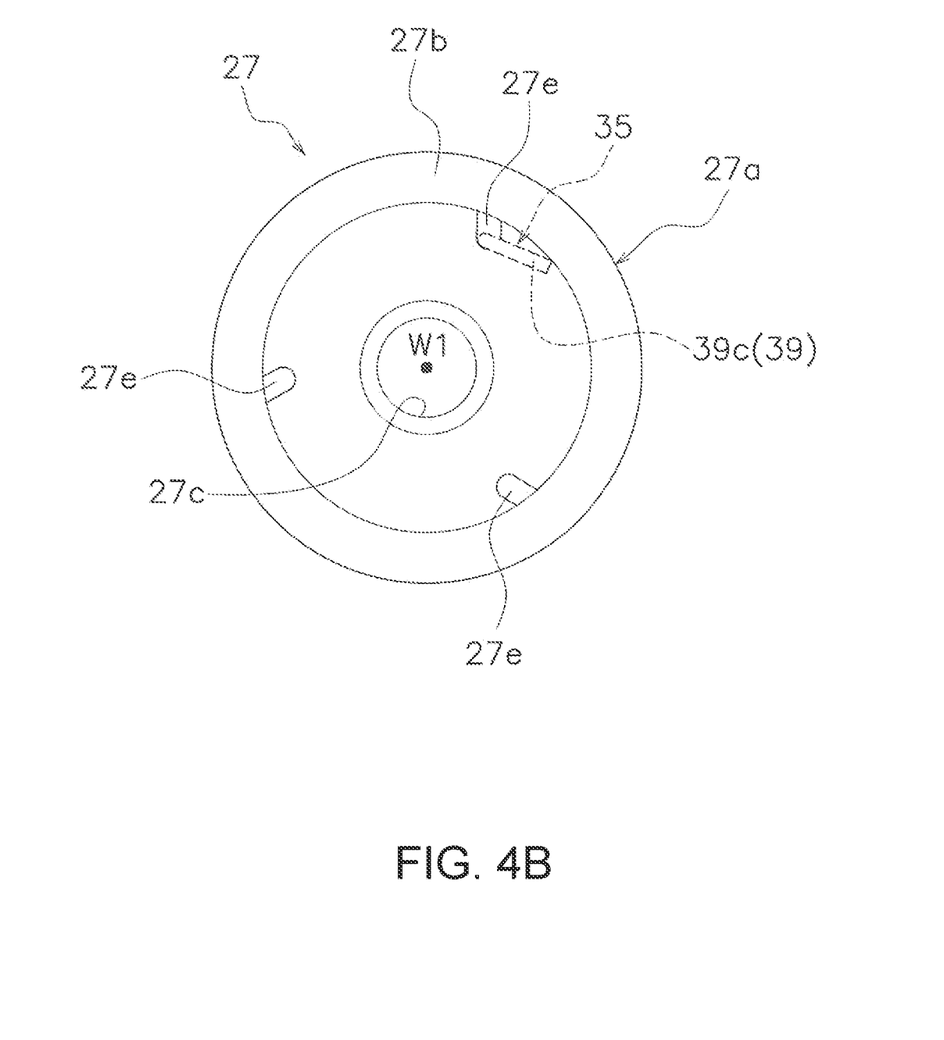
FIG. 4B is a side view (front surface) of the worm shaft gear.

As shown in FIGS. 3, 4A, and 4B, the worm shaft gear 27 includes a gear body 27a, an annular protrusion 27b, an insertion hole 27c, an annular stepped portion 27d, at least one hooking hole 27e (one example of a hole portion), and at least one guide groove 27f.

The gear body 27a is disk-shaped. The gear body 27a meshes with a second small-diameter gear 33b (described further below) of the speed-reducing mechanism 19. As shown in FIG. 4B, the annular protrusion 27b protrudes from the outer circumferential portion of the gear body 27a with an annular shape in the axial direction in which axis of rotation W2 of the worm shaft gear 27 extends.

As shown in FIGS. 3, 4A, and 4B, the insertion hole 27c is disposed on the gear body 27a. For example, the insertion hole 27c passes through the gear body 27a in the axial direction in which axis of rotation W2 of the worm shaft gear 27 extends. The worm shaft 23 is inserted through the insertion hole 27c.

As shown in FIGS. 3 and 4A, the annular stepped portion 27d is disposed on the inner circumferential portion of the gear body 27a. The annular stepped portion 27d is disposed on the outside of the insertion hole 27c in the radial direction around axis of rotation W2 of the worm shaft gear 27. The annular stepped portion 27d extends in the circumferential direction around axis of rotation W2 of the worm shaft gear 27.

The at least one hooking hole 27e includes a plurality of insertion holes 27e. In the present embodiment, a plurality (for example, three) of the hooking holes 27e are disposed on the outer circumferential portion of the gear body 27a. The plurality of hooking holes 27e are arranged separately from each other in the circumferential direction around axis of rotation W2 of the worm shaft gear 27. The plurality of hooking holes 27e pass through the gear body 27a in the axial direction in which the axis of rotation W2 of the worm shaft gear 27 extends. As shown in FIG. 4B, the plurality of hooking holes 27e are arranged on the radially inward side of the annular protrusion 27b.

As shown in FIGS. 3 and 4A, the at least one guide groove 27f includes a plurality of (for example, three) guide grooves 27f. In the present embodiment, a plurality (for example, three) of the guide grooves 27f are disposed on the gear body 27a. For example, the plurality of guide grooves 27f are arranged separately from each other in the circumferential direction around the axis of rotation W2 of the worm shaft gear 27. The plurality of guide grooves 27f extends separately from the annular stepped portion 27d toward the plurality of hooking holes 27e.

As shown in FIG. 2, the pinion gear 17 is formed with a tubular shape. The pinion gear 17 is supported by the reel body 3 so as to be rotatable. The pinion gear 17 is disposed on the radially outward side of the spool shaft 15. The pinion gear 17 rotates with respect to the spool shaft 15. The pinion gear 17 rotates about spool axis X1.

Figure 5:
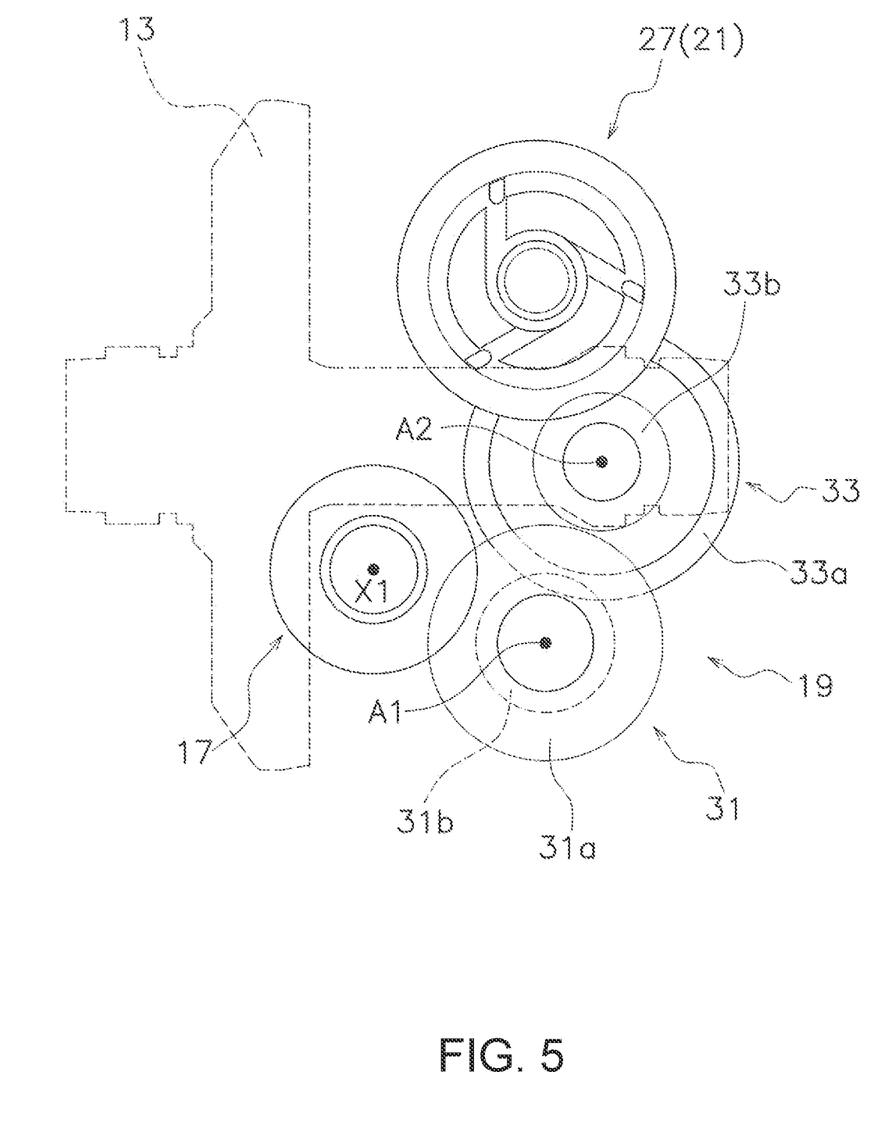
FIG. 5 is a side view for explaining a speed-reducing mechanism.

As shown in FIG. 5, the speed-reducing mechanism 19 reduces the speed of rotation of the pinion gear 17 and transmits it to the oscillating mechanism 21. In FIG. 5, the gear teeth of each gear have been omitted. The speed-reducing mechanism 19 is disposed between the pinion gear 17 and the oscillating mechanism 21. For example, the speed-reducing mechanism 19 is disposed between the pinion gear 17 and the worm shaft gear 27.

The speed-reducing mechanism 19 has at least two intermediate gears 31, 33. For example, the speed-reducing mechanism 19 has a first intermediate gear 31 and a second intermediate gear 33. The first intermediate gear 31 is rotatable about a first axis A1 parallel to spool axis X1. The first intermediate gear 31 is supported by the reel body 3 so as to be rotatable. The first intermediate gear 31 has a first large-diameter gear 31a and a first small-diameter gear 31b.

The first large-diameter gear 31a meshes with the pinion gear 17. The axis of rotation of the first large-diameter gear 31a is the first axis A1. The first small-diameter gear 31b has a smaller diameter than the first large-diameter gear 31a. The first small-diameter gear 31b is integrally formed with the first large-diameter gear 31a and integrally rotates with the first large-diameter gear 31a. The axis of rotation of the first small-diameter gear 31b is first axis A1.

The second intermediate gear 33 is rotatable about a second axis A2 parallel to the first axis A1. The second intermediate gear 33 is supported by the reel body 3 so as to be rotatable. The second intermediate gear 33 has a second large-diameter gear 33a and a second small-diameter gear 33b.

The second large-diameter gear 33a meshes with the first small-diameter gear 31b. The axis of rotation of the second large-diameter gear 33a is second axis A2. The second small-diameter gear 33b has a smaller diameter than the second large-diameter gear 33a. The second small-diameter gear 33b is integrally formed with the second large-diameter gear 33a and integrally rotates with the second large-diameter gear 33a. The axis of rotation of the second small-diameter gear 33b is second axis A2. The second small-diameter gear 33b meshes with the worm shaft gear 27.

When the handle shaft 11 is rotated by the rotary operation of the handle 5, the drive gear 13 is rotated. The rotation of the drive gear 13 is transmitted to the pinion gear 17. The rotation of the pinion gear 17 is transmitted to the worm shaft gear 27 via the speed-reducing mechanism 19. The rotation of the worm shaft gear 27 is transmitted to the worm shaft 23 via the torque-limiting mechanism 34, shown in FIG. 6. Here, when the worm shaft 23 rotates, the slider 25 and the spool shaft 15 moves in the front-rear direction.

As shown in FIGS. 1 and 2, the rotor 9 is used to wind a fishing line around the spool 7. The rotor 9 is disposed on a front portion of the reel body 3. The rotor 9 is configured so as to be rotatable with respect to the reel body 3. The rotor 9 is disposed on the radially outward side of the pinion gear 17. The rotor 9 is mounted so as to be integrally rotatable with respect to the pinion gear 17.

When the handle shaft 11 is rotated by the rotary operation of the handle 5, the drive gear 13 is rotated. The rotation of the drive gear 13 is transmitted to the pinion gear 17. The rotor 9 rotates in conjunction with the rotation of the pinion gear 17.

Figure 6:
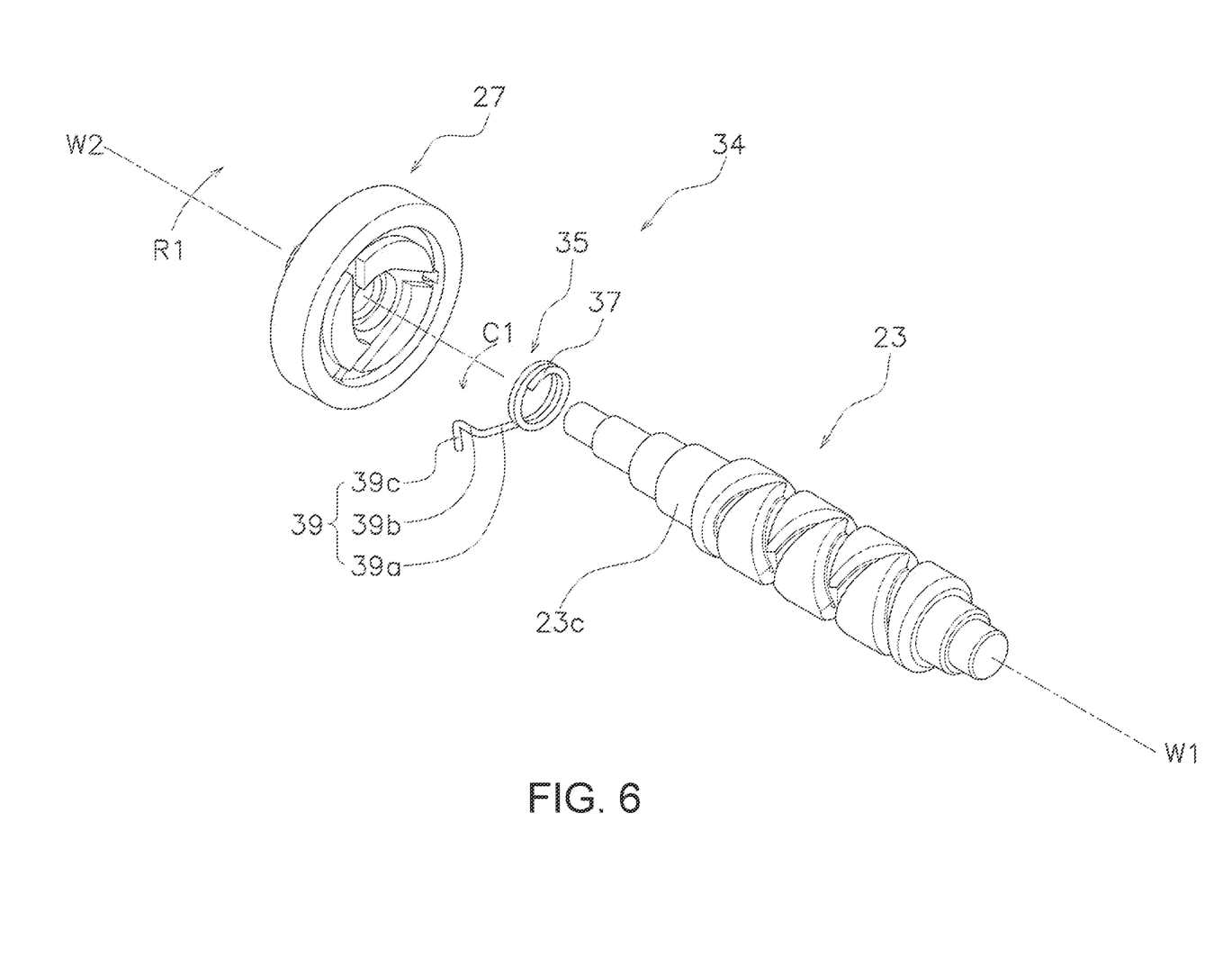
FIG. 6 is an exploded perspective view for explaining the torque-limiting mechanism.

As shown in FIG. 6, the torque-limiting mechanism 34 has the worm shaft 23, the worm shaft gear 27, and the torsion spring 35 (one example of a frictional force-generating member). The torque-limiting mechanism 34 permits or cancels the transmission of torque from the worm shaft gear 27 to the worm shaft 23 by the frictional force of the torsion spring 35.

The torsion spring 35 contacts the worm shaft 23 and/or the worm shaft gear 27, thereby generating a frictional force in the circumferential direction around axis of rotation W2 of the worm shaft gear 27. In the present embodiment, the torsion spring 35 contacts the worm shaft 23, thereby generating a frictional force in the circumferential direction around axis of rotation W1 of the worm shaft 23.

As shown in FIG. 6, the torsion spring 35 is disposed on the outer circumferential surface of the worm shaft 23 so as to be slidable. As shown in FIG. 4B, the torsion spring 35 is engaged with the worm shaft gear 27.

As shown in FIG. 6, the torsion spring 35 has a first spring portion 37 and a hooking portion 39. The first spring portion 37 is a coil spring. The first spring portion 37 is wound around a first winding direction C1. The first winding direction C1 is the direction in which the wire material of the first spring portion 37 is wound, starting from the hooking portion 39.

The first spring portion 37 is disposed on the outer circumferential surface of the worm shaft 23 such that first winding direction C1 is opposite to line-winding direction R1 of the worm shaft gear 27. For example, the first spring portion 37 is disposed on the outer circumferential surface of the spring accommodation portion 23c of the worm shaft 23 such that the first winding direction C1 is opposite to the line-winding direction R1 of the worm shaft gear 27. The inner circumferential surface of the first spring portion 37 contacts the outer circumferential surface of the spring accommodation portion 23c of the worm shaft 23.

As a result, when the worm shaft gear 27 rotates in first direction of rotation R1, the first spring portion 37 wound and tightened in first winding direction C1. A frictional force is generated between the inner circumferential surface of the first spring portion 37 and the outer circumferential surface of the spring accommodation portion 23c of the worm shaft 23. By this frictional force, torque is transmitted from the worm shaft gear 27 to the worm shaft 23.

The line-winding direction R1 of the worm shaft gear 27 is defined as the direction around axis of rotation W2 of the worm shaft gear 27. For example, the line-winding direction R1 of the worm shaft gear 27 is the same as the direction in which the worm shaft 23 rotates when the slider 25 and the spool shaft 15 move in the front-rear direction.

As shown in FIGS. 4A and 4B, the hooking portion 39 is hooked in the hooking hole 27e. For example, the hooking portion 39 extends from the first spring portion 37 in a direction away from axis of rotation W1 of the worm shaft 23. The hooking portion 39 is hooked to any one of the plurality of hooking holes 27e. As shown in FIG. 6, the hooking portion 39 includes an arm portion 39a, an insertion portion 39b, and a pawl portion 39c. The arm portion 39a extends from the first spring portion 37. The insertion portion 39b is integrally formed with the arm portion 39a. The pawl portion 39c is formed integrally with the insertion portion 39b.

As shown in FIG. 4A, an end portion of the first spring portion 37 is disposed on the annular stepped portion 27d of the worm shaft gear 27. The arm portion 39a of the hooking portion 39 is disposed in the guide groove 27f of the worm shaft gear 27. The insertion portion 39b is inserted into any one of the plurality of insertion holes 27c.

As shown in FIG. 4B, the pawl portion 39c extends along the side surface of the gear body 27a of the worm shaft gear 27. The distal end of the pawl portion 39c contacts the inner circumferential surface of the annular protrusion 27b of the worm shaft gear 27. By bringing the distal end of the pawl portion 39c into contact with the inner circumferential surface of the annular protrusion 27b of the worm shaft gear 27, it is possible to prevent the rotation of the torsion spring 35.

As shown in FIG. 6, in the torque-limiting mechanism 34 described above, since the first winding direction C1 of the first spring portion 37 of the torsion spring 35 is opposite to first direction of rotation R1 of the worm shaft gear 27, when the worm shaft gear 27 is rotated, the first spring portion 37 of the torsion spring 35 tightens.

As a result, the torque of the worm shaft gear 27 is transmitted to the worm shaft 23 via the frictional force between the inner circumferential surface of the first spring portion 37 of the torsion spring 35 and the outer circumferential surface of the worm shaft 23.

Here, if the torque of the worm shaft gear 27 exceeds the permitted torque, the inner circumferential surface of the first spring portion 37 of the torsion spring 35 slides on the outer circumferential surface of the worm shaft 23. In this state, torque is not transmitted from the worm shaft gear 27 to the worm shaft 23.

The spinning reel 1 described above has the following features. In the spinning reel 1, if the torque of the worm shaft gear 27 is less than or equal to the permitted torque, a frictional force is generated between the torsion spring 35 and the worm shaft 23 in the circumferential direction around axis of rotation W2 of the worm shaft 23.

In this state, if the torque of the worm shaft gear 27 exceeds the permitted torque, the worm shaft gear 27 continuously rotates with respect to the worm shaft gear 27. As a result, compared with the prior art, it is possible to reduce the size of the worm shaft gear 27 that constitutes the torque-limiting mechanism 34.

In the spinning reel 1, the torsion spring 35 is disposed on the outer circumferential surface of the worm shaft 23 in a hooked state to the worm shaft gear 27. By this configuration, it is possible stably to generate a frictional force between the torsion spring 35 and the worm shaft 23.

In the spinning reel 1, the first spring portion 37 of the torsion spring 35 is disposed on the outer circumferential surface of the worm shaft 23 such that the first winding direction C1 is opposite to line-winding direction R1 of the worm shaft gear 27. By this configuration, when the worm shaft gear 27 rotates in the line-winding direction R1, since the first spring portion 37 of the torsion spring 35 tightens, it is advantageously possible to transmit the torque from the worm shaft gear 27 to the worm shaft 23.

In the spinning reel 1, the hooking portion 39 of the torsion spring 35 is hooked in the hooking hole 27e of the worm shaft gear 27. By this configuration, the torsion spring 35 can advantageously be engaged with the worm shaft gear 27.

In the hooking portion 39 of the torsion spring 35 of the spinning reel 1, the insertion portion 39b is inserted into the hooking hole 27e of the worm shaft gear 27, and the pawl portion 39c extends along the side surface of the worm shaft gear 27. As a result, the torsion spring 35 can advantageously engage the worm shaft gear 27.

FIRST MODIFIED EXAMPLE

In the embodiment described above, an example was presented in which the torsion spring 35 includes the first spring portion 37. In this case, depending on the shape of the groove portion 23b of the worm shaft 23, if an external force acts on the spool shaft 15 in a direction opposite to the direction in which the spool shaft 15 advances, there is the risk that the worm shaft 23 will rotate in the opposite direction to first direction of rotation R1, thereby loosening the first spring portion 37.

Figure 7:
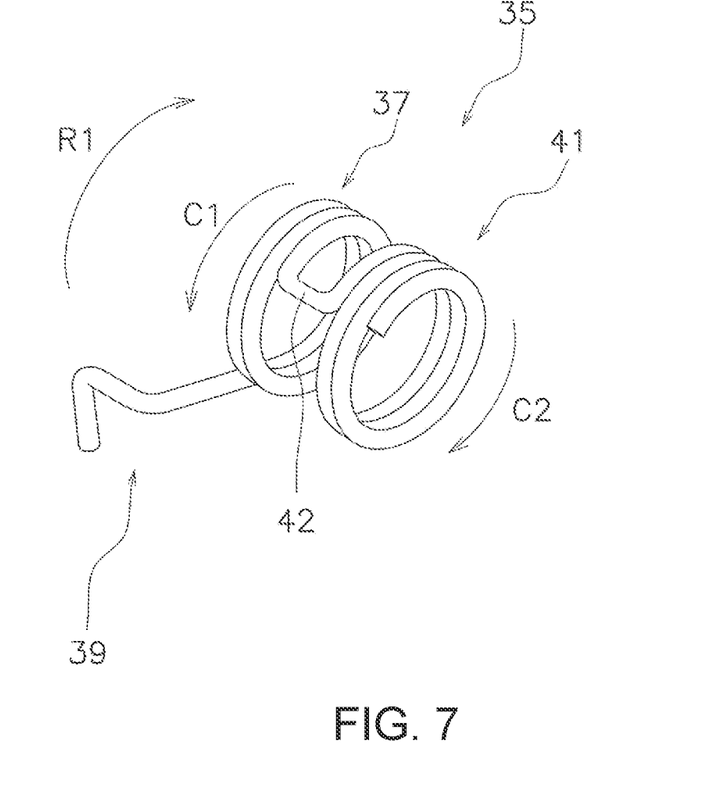
FIG. 7 is a perspective view of a torsion spring according to a first modified example.

In order to solve this problem, as shown in FIG. 7, the torsion spring 35 can also have a second spring portion 41. The second spring portion 41 is a coil spring. The second spring portion 41 is connected to the first spring portion 37. The second spring portion 41 is integrally formed with the first spring portion 37. For example, the second spring portion 41 is integrally formed with the first spring portion 37 via a connecting portion 42.

The second spring portion 41 is wound around a second winding direction C2, opposite to the first winding direction C1. The second winding direction C2 is the direction in which the wire material of the second spring portion 41 is wound, starting from the terminal end of the first spring portion 37, such as the connecting portion 42.

For example, the second spring portion 41 is disposed on the outer circumferential surface of the spring accommodation portion 23c of the worm shaft 23 such that second winding direction C2 is the same as the line-winding direction R1 of the worm shaft gear 27. The inner circumferential surface of the second spring portion 41 comes into contact with the outer circumferential surface of the spring accommodation portion 23c of the worm shaft 23.

As a result, when the worm shaft 23 rotates in the opposite direction to line-winding direction R1, the second spring portion 41 tightens. A frictional force is generated between the inner circumferential surface of the second spring portion 41 and the outer circumferential surface of the spring accommodation portion 23c of the worm shaft 23. By this frictional force, it is possible to suppress the loosening of the first spring portion 37 with the frictional force of an O-ring 43.

SECOND MODIFIED EXAMPLE

Figure 8:
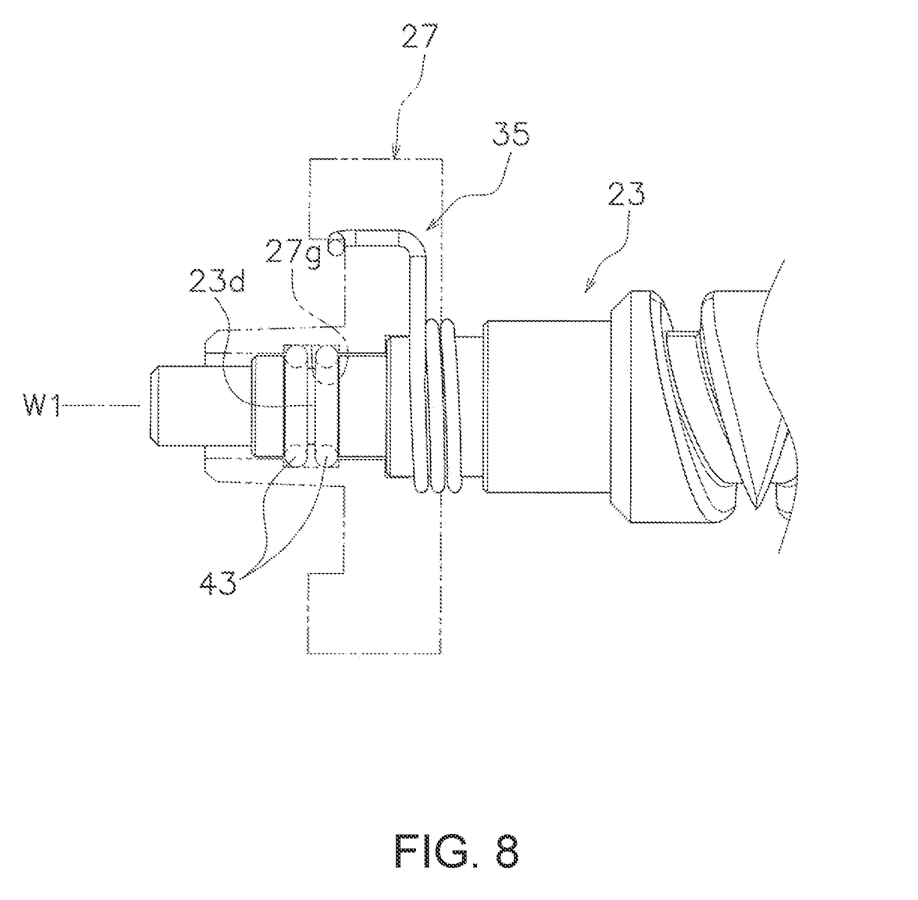
FIG. 8 is a side view of the torque-limiting mechanism according to a second modified example.

As shown in FIG. 8, the torque-limiting mechanism 34 of the embodiment described above can also have an O-ring 43. The O-ring 43 is disposed between the outer circumferential surface of the worm shaft 23 and the inner circumferential surface of the insertion hole 27c of the worm shaft gear 27. For example, the worm shaft 23 also has a first ring accommodation portion 23d. The first ring accommodation portion 23d is disposed on the outer circumferential surface of the shaft body 23a. The first ring accommodation portion 23d is an annular groove.

The worm shaft gear 27 also has a second ring accommodation portion 27g. The second ring accommodation portion 27g is disposed on the inner circumferential surface of the insertion hole 27c. The second ring accommodation portion 27g is an annular groove. The second ring accommodation portion 27g is disposed on the radially outward side of the first ring accommodation portion 23d.

The O-ring 43 is disposed between the first ring accommodation portion 23d and the second ring accommodation portion 27g, in the radial direction away from axis of rotation W1 of the worm shaft 23. The O-ring 43 contacts the bottom portion of the first ring accommodation portion 23d and the bottom portion of the second ring accommodation portion 27g. The O-ring 43 is preferably disposed in a radially compressed state between the first ring accommodation portion 23d and the second ring accommodation portion 27g.

By this configuration, the loosening of the first spring portion 37, described in the first modified example above, can be suppressed by the frictional force of the O-ring 43.

THIRD MODIFIED EXAMPLE

In the embodiment described above, an example was presented in which the torsion spring 35 is used as a frictional force-generating member in the torque-limiting mechanism 34. In the torque-limiting mechanism 34, the frictional force-generating member can be configured in any matter as long it can contact the worm shaft 23 and/or the worm shaft gear 27.

Figure 9:
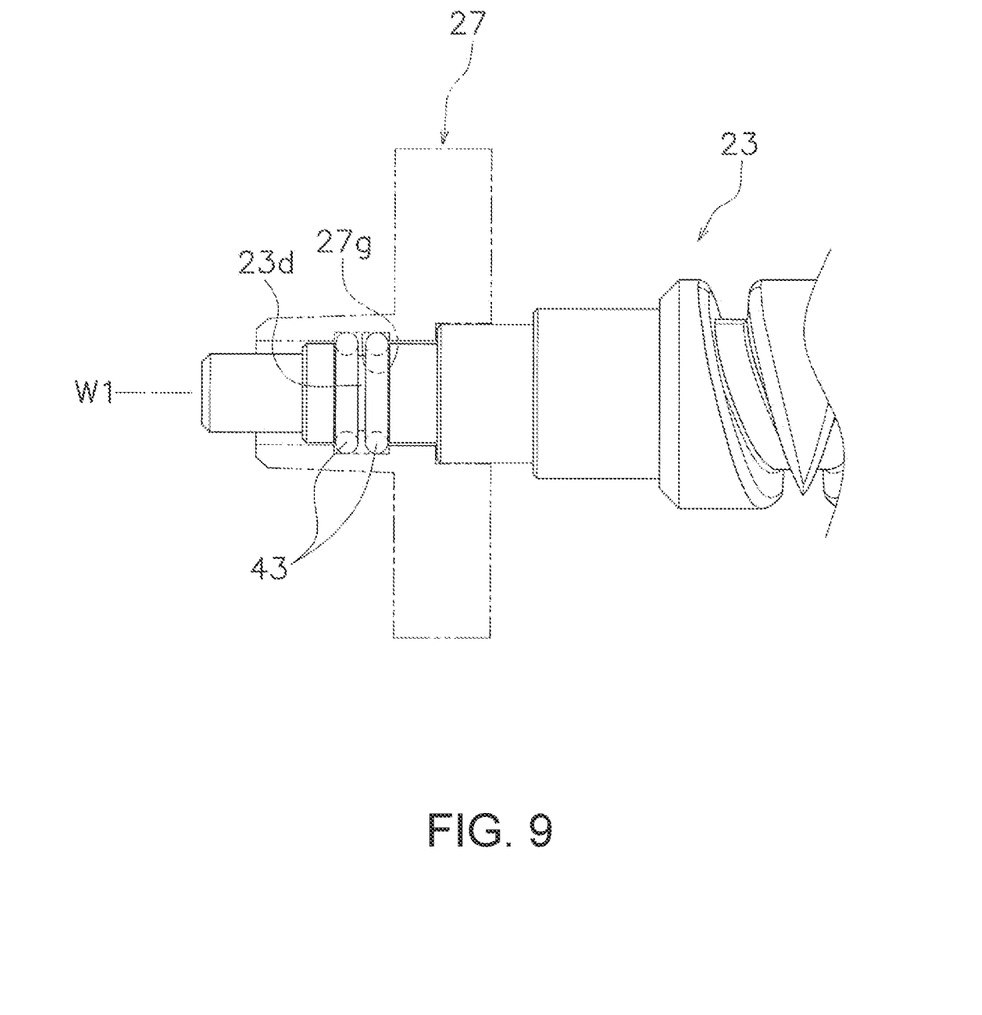
FIG. 9 is a side view of the torque-limiting mechanism according to a third modified example.

For example, as shown in FIG. 9, the O-ring 43 used in the second modified example above can be used as the frictional force-generating member without using the torsion spring 35. In this case, the O-ring 43 is disposed between the first ring accommodation portion 23d and the second ring accommodation portion 27g, in the radial direction away from axis of rotation W1 of the worm shaft 23 in a compressed state.

In this configuration, if the torque of the worm shaft gear 27 is less than or equal to the permitted torque, the torque of the worm shaft gear 27 is transmitted to the worm shaft 23 via the O-ring 43. Here, if the torque of the worm shaft gear 27 exceeds the permitted torque, the O-ring 43 slides with the first ring accommodation portion 23d and/or the second ring accommodation portion 27g. In this state, torque is not transmitted from the worm shaft gear 27 to the worm shaft 23. Even with this configuration, the same effect as the above-described embodiment can be obtained.

FOURTH MODIFIED EXAMPLE

Figure 10:
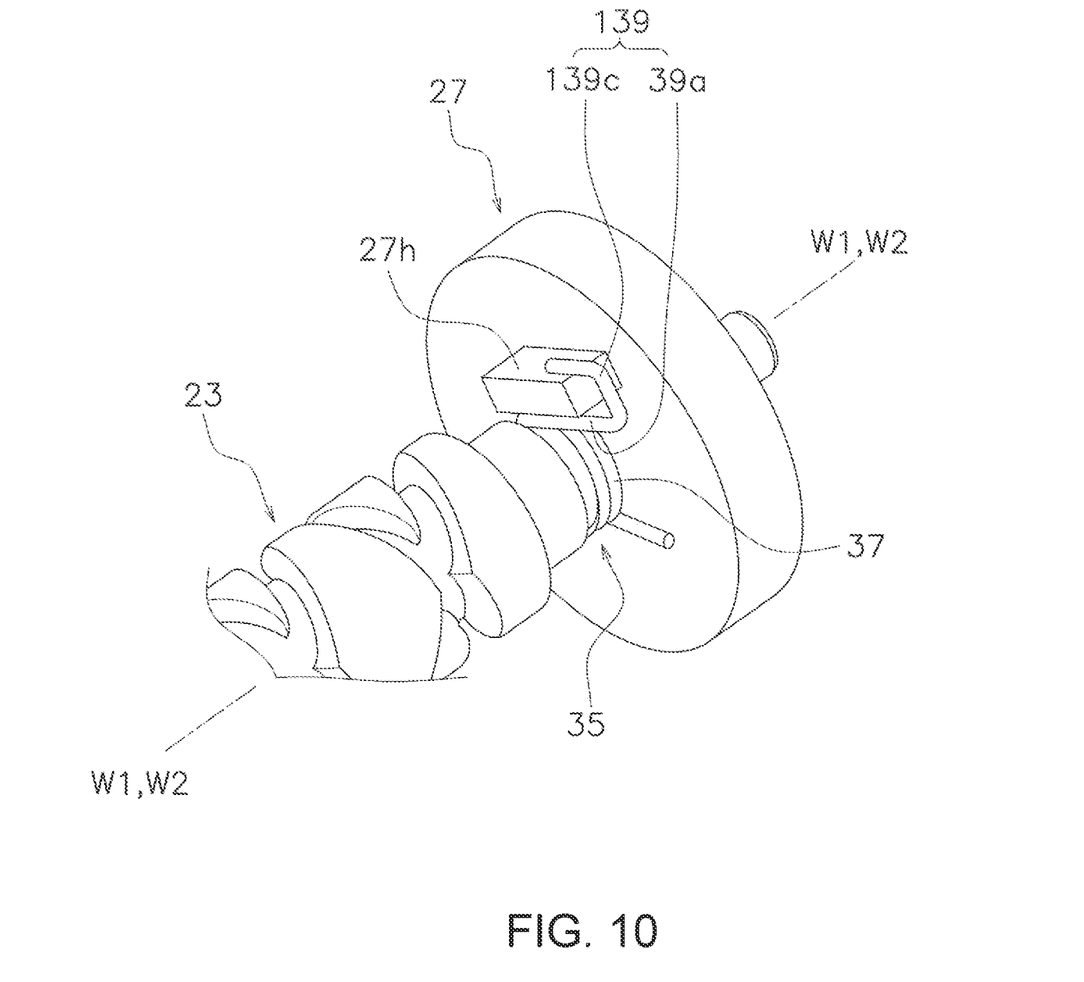
FIG. 10 is a side view of the torque-limiting mechanism according to a fourth modified example.

In the embodiment described above, an example was presented in which the torsion spring 35 is hooked to the hooking hole 27e of the worm shaft gear 27. As shown in FIG. 10, the torsion spring 35 can be hooked to a projection 27h of the worm shaft gear 27. In this case, the projection 27h protrudes from the side surface of the gear body 27a in the axial direction.

The torsion spring 35 has the first spring portion 37 and a hooking portion 139. The configuration of the first spring portion 37 is the same as that of the embodiment described above. The hooking portion 139 has the arm portion 39a and a hook portion 139c. The configuration of the arm portion 39a is the same as that of the embodiment described above.

The hook portion 139c is integrally formed with the arm portion 39a. The hook portion 139c is formed in the shape of a hook. The hook portion 139c is hooked to the projection 27h. Even with this configuration, the same effect as the above-described embodiment can be obtained.

Embodiments of the present invention can be used in a spinning reel.

What is claimed is:
1. A spinning reel, comprising:
a reel body;
a spool shaft supported by the reel body;

a reciprocating mechanism having a slider mounted on the spool shaft, a worm shaft configured to rotate to move the spool shaft and the slider back and forward reciprocally, and a worm shaft gear supported so as to be rotatable with respect to the worm shaft; and a torque-limiting mechanism including a frictional force-generating member disposed between the worm shaft and the worm shaft gear and configured to contact the worm shaft or the worm shaft gear to generate a frictional force in a circumferential direction and to permit or cancel transmission of torque from the worm shaft gear to the worm shaft by the frictional force.

2. The spinning reel according to claim 1, wherein
the frictional force-generating member is a torsion spring hooked to the worm shaft gear and slideably disposed on an outer circumferential surface of the worm shaft.

3. The spinning reel according to claim 2, wherein
the torsion spring has a first spring portion wound in a first winding direction, and
the first spring portion is disposed on the outer circumferential surface of the worm shaft such that the first winding direction is opposite to a line-winding direction of the worm shaft gear.

4. The spinning reel recited in claim 3, wherein
the torsion spring includes a second spring portion wound in a second winding direction opposite to the first winding direction and connected to the first spring portion, and the second spring portion is disposed on the outer circumferential surface of the worm shaft such that the second winding direction is a same as the line-winding direction of the worm shaft gear.

5. The spinning reel according to claim 2, wherein
the worm shaft gear has a hole portion extending in an axial direction of the worm shaft, and
the torsion spring has a hooking portion that is hooked to the hole portion.

6. The spinning reel according to claim 5, wherein
the hooking portion includes an insertion portion that is inserted into the hole portion and a pawl portion that extends from the insertion portion along a side surface of the worm shaft gear.

7. The spinning reel according to claim 2, wherein
the worm shaft gear includes a projection that protrudes in an axial direction of the worm shaft, and
the torsion spring has a hooking portion that is hooked to the projection.

8. The spinning reel according to claim 1, wherein
the worm shaft gear has an insertion hole into which the worm shaft is inserted, and
the torque-limiting mechanism has an O-ring disposed between an outer circumferential surface of the worm shaft and an inner circumferential surface of the insertion hole.

* * * * *